May 31, 1949. H. E. WILT ET AL 2,471,598
TOOL FOR INSTALLING HOLLOW RIVETS
Filed Dec. 3, 1945
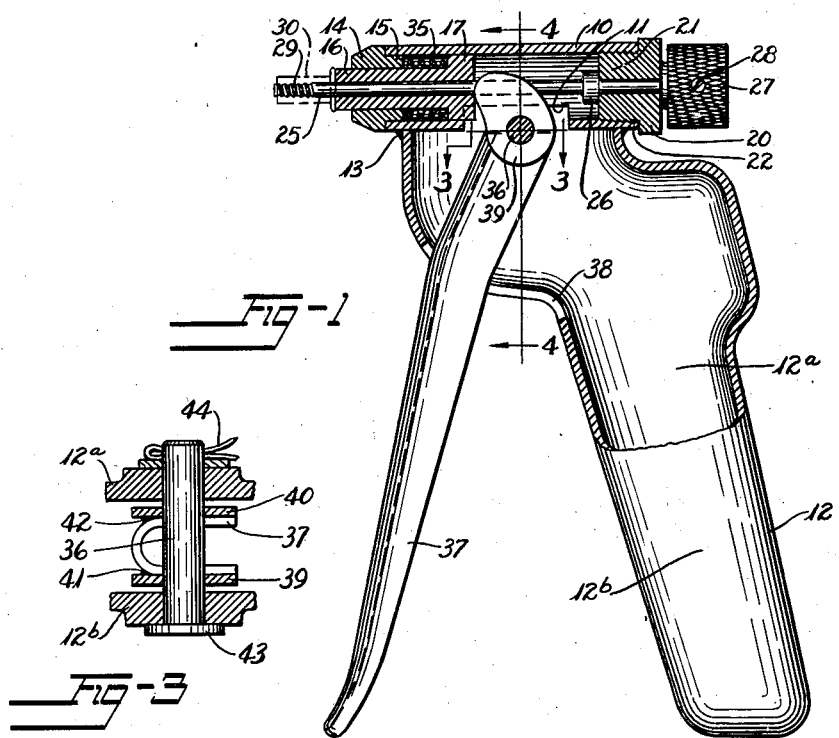
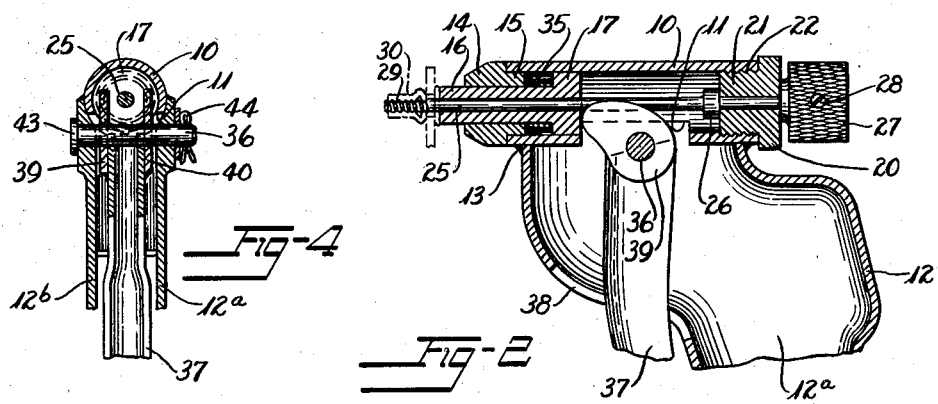
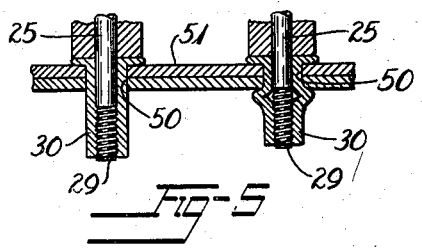
Inventor
Homer E. Wilt
George A. Tincler
By
Att'y Patented May 31, 1949

2,471,598

UNITED STATES PATENT OFFICE 2,471,598

TOOL FOR INSTALLING HOLLOW RIVETS

Homer E. Wilt, Akron, and George A. Tincler, Randolph, Ohio, assignors to The B. F. Goodrich Company, New York, N. Y., a corporation of New York Application December 3, 1945, Serial No. 632,570

3 Claims. (Cl. 218—19)

This invention relates to tools for installing hollow internally threaded rivets, such as those of the Waner Patent No. 2,149,199.

Objects of the invention are to provide a compact hand-operated tool, to provide a tool having great leverage, to provide for upsetting a rivet in close quarters, to provide for manipulation from one side of the axis of the rivet, and to provide simplicity of construction.

These and other objects will appear from the following description and the accompanying drawings.

Of the drawings:

Fig. 1 is a side elevation of a tool constructed in accordance with and embodying the invention, partly broken away and partly in section, to show its construction, the rivet being shown in position to upset it by dot-and-dash lines.

Fig. 2 is a similar view showing the tool in position after the rivet is upset, parts being broken away.

Fig. 3 is a cross-sectional view of the tool taken on line 3—3 of Fig. 1.

Fig. 4 is a cross-sectional view thereof taken on line 4—4 of Fig. 1, parts being broken away.

Fig. 5 is a cross-sectional view of a laminated wall showing rivets mounted upon the nose of the tool, one in condition for upsetting, and the other in condition after upsetting.

Referring to the drawings, the numeral 10 designates a short tubular housing having a side opening 11 therethrough about which is secured an offset hollow handle 12. The housing and handle are preferably formed of light weight sheet metal and are preferably secured to each other by welding, as at 13.

An annular bushing 14 is secured to the nose of the housing, and for this purpose has an extension 15 of reduced diameter adapted to enter the bore of the housing and preferably secured therein as by screw threads or other fastening means. A tubular anvil 16 is slideably mounted in the bushing 14 for movement axially of the housing and has an enlarged flange portion 17 slideably engaging the bore of the housing.

The opposite end of the bore of the housing is closed by an annular bushing 20 having a threaded portion 21 of reduced diameter threaded as at 22 to engage cooperating threads formed in the bore of the housing at the breach thereof.

For engaging the rivet a rod 25 is rotatably mounted in the bore of the bushing 21 with respect to which it is held against axial movement by a collar 26, fixed to and preferably integral with the rod at the inner face of the bushing 21, and a knob 27 secured to the rod at the opposite outer face of the bushing 21, as by a set screw 28. The knob is preferably knurled for grasping it for rotation. The opposite end of the rod 25 is threaded, as at 29 to engage within the threaded bore of the rivet 30.

For holding the anvil 16, normally in retracted position, a compression coil spring 35 is mounted about the anvil between the bushing 14 and flange 17 against which it impinges.

For advancing the anvil to upset the rivet threaded on the rod 25, a hinge pin 36 extends through opposite walls 12a, 12b of the handle 12 at the opening 11 of the housing 10 and a lever 37, preferably formed of sheet metal folded in U-shaped cross-section, is pivotally mounted upon the pin and extends through an opening 38 in the handle 12. A pair of cam members 39, 40 are secured to the handles as by welding 41, 42, one at each side of the rod 25 where they bear against the flanged end of the anvil so as to advance it along the rod 25 when the lever 37 is moved toward the handle 12. The pin 36 has a head 43 at one end and is held in place by a cotter pin 44 passing through an opening therethrough at its opposite end.

The operation of the tool is as follows:

With the parts of the tool in the position illustrated in Fig. 1, a rivet 30 is held between the thumb and forefinger of one hand while the tool is held by the handle 12 with the other hand and the end of the rod 25 is positioned at the flanged end of the bore of the rivet. The knob 27 is then rotated, turning the rod in a direction to cause its threads to engage in the threads of the bore of the rivet. Turning of the knob is continued until the flange of the rivet impinges against the anvil 16. The operator then inserts the rivet through an aperture 50 of a wall 51 to which the rivet is to be secured until the flange of the rivet impinges against the face of the wall as seen at the left of Fig. 5. With the rivet and tool in this position, the operator embraces with his hand both the handle 12 and the lever 37 and squeezes the tool forcing the lever 37 toward the handle 12. Whereupon, the cams 39, 40 force the anvil 16 to move toward the nose of the tool relative to the rod 25 and housing 10, and the anvil 4 exerts an upsetting force against the flanged end of the rivet, forming the rivet to its upset condition as shown at the right of Fig. 5. Pressure on the lever 37 is then released and knob 27 is rotated in the opposite direction to unscrew the rod from the rivet while the coil spring 35 returns the anvil to its normal position.

Variations may be made without departing from the scope of the invention as it is defined by the following claims.

We claim:

1. A tool for installing a hollow internally threaded rivet, said tool comprising a tubular housing having a side opening, a hollow handle of sheet metal secured to said housing about said opening and extending substantially radial to the axis of the housing, a bushing secured in one end of the housing, a hollow anvil slideably mounted in the bore of said bushing for movement axially of said housing, a bushing secured in the opposite end of said housing, a rod rotatably mounted in the bores of said last-named bushing and said anvil and having a threaded portion extending beyond said anvil for engagement with the threaded bore of a rivet, a knob secured to said rod beyond said housing for rotating said rod to engage it in the threaded bore of a rivet, a pivot pin extending through said handle in said side opening, cam means pivotally mounted on said pivot pin at said side opening and extending therethrough in engagement with the inner face of said anvil, spring means for holding said anvil in retracted position, and a lever secured to said cam and extending through and along said handle for rotating said cam to advance said anvil along said rod to effect upsetting of the rivet.

2. A tool for installing a hollow internally threaded rivet, said tool comprising a tubular housing having a side opening, a hollow handle of sheet metal secured to said housing about said opening and extending substantially radial to the axis of the housing, a bushing secured in one end of the housing, a hollow anvil slideably mounted in the bore of said bushing for movement axially of said housing, a bushing secured in the opposite end of said housing, a rod rotatably mounted in the bores of said last-named bushing and said anvil and having a threaded portion extending beyond said anvil for engagement with the threaded bore of a rivet, a knob secured to said rod beyond said housing for rotating said rod to engage it in the threaded bore of a rivet, a pivot pin extending through said handle in said side opening, cam means pivotally mounted on said pivot pin at said side opening and extending therethrough in engagement with the inner face of said anvil, spring means for holding said anvil in retracted position, and a lever secured to said cam and extending through and along said handle for rotating said cam to advance said anvil along said rod to effect upsetting of the rivet, said cam means comprising a pair of similar cams engaging said anvil at opposite sides of said rod.

3. A tool for installing a hollow internally threaded rivet, said tool comprising an open-ended straight bored housing of metal tubing having a side opening, a hollow handle of sheet metal secured to said housing about said side opening and extending substantially radial to the axis of the housing, a bushing coaxial with said housing at one end of its bore and secured thereto, a hollow anvil slideably mounted in the bore of said bushing for movement axially of said housing, a bushing coaxial with said housing and secured thereto at the opposite end thereof, said bushings being aligned coaxially by the bore of said housing, a rod rotatably mounted in aligned bores of said last named bushing and said anvil and having a threaded portion extending beyond said anvil for engagement with the threaded bore of a rivet, a manipulating element secured to said rod beyond said housing for rotating said rod to engage it in the threaded bore of a rivet, a pivot pin extending through said handle from side to side thereof in said side opening, a hand operated cam lever pivotally mounted on said pivot pin at said side opening and having a cam portion engaging the inner face of said anvil to advance said anvil toward the rivet and a lever portion extending through a clearance opening in said hollow handle and along the handle for rotating said cam when the lever is forced toward said handle to advance said anvil along said rod for upsetting the rivet, and a coil spring surrounding said anvil within said housing between the first said bushing and a shoulder of said anvil for retracting said anvil.

HOMER E. WILT.
GEORGE A. TINCLER.

REFERENCES CITED

The following references are of record in the file of this patent:

UNITED STATES PATENTS

| Number | Name | Date |
|---|---|---|
| 2,069,907 | Waner | Feb. 9, 1937 |
| 2,115,251 | Buck | Apr. 26, 1938 |
| 2,170,323 | Gorshkoff | Aug. 22, 1939 |
| 2,283,665 | Cadden | May 19, 1942 |
| 2,324,104 | Moss | July 13, 1943 |
| 2,340,066 | Lee | Jan. 25, 1944 |
| 2,401,724 | Dowdle | June 11, 1946 |
| 2,403,675 | Mitchell | July 9, 1946 |
| 2,437,191 | Gill | Mar. 2, 1948 |

FOREIGN PATENTS

| Number | Country | Date |
|---|---|---|
| 451,396 | Great Britain | Aug. 5, 1936 |